US010664417B2

(12) United States Patent
Hundal et al.

(10) Patent No.: US 10,664,417 B2
(45) Date of Patent: *May 26, 2020

(54) SYSTEMS AND METHODS FOR EXCHANGING USB INFORMATION WITH SELECTED REMOTE DEVICES

(71) Applicant: Icron Technologies Corporation, Burnaby (CA)

(72) Inventors: Sukhdeep Singh Hundal, Surrey (CA); David Patrick Frey, Burnaby (CA); David Robert Meggy, Coquitlam (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,468

(22) Filed: Oct. 10, 2017

(65) Prior Publication Data

US 2018/0032451 A1  Feb. 1, 2018

Related U.S. Application Data

(63) Continuation of application No. 13/791,579, filed on Mar. 8, 2013, now Pat. No. 9,817,772.

(60) Provisional application No. 61/740,378, filed on Dec. 20, 2012.

(51) Int. Cl.
*G06F 13/12* (2006.01)
*G06F 13/40* (2006.01)

(52) U.S. Cl.
CPC ........ *G06F 13/126* (2013.01); *G06F 13/4045* (2013.01); *G06F 2213/0042* (2013.01)

(58) Field of Classification Search
CPC ....................................................... G06F 3/013
See application file for complete search history.

(56) References Cited

U.S. PATENT DOCUMENTS

| 6,603,744 | B2 | 8/2003 | Mizutani et al. |
| 7,073,010 | B2 * | 7/2006 | Chen ..................... G06F 13/385 710/313 |
| 7,149,833 | B2 | 12/2006 | McLeod |
| 7,162,407 | B2 | 1/2007 | Poley et al. |
| 7,587,536 | B2 | 9/2009 | McLeod |

(Continued)

OTHER PUBLICATIONS

Howard, J., et al., "Wireless Universal Serial Bus Specification, Revision 1.1," Sep. 9, 2010, 325 pages.

(Continued)

*Primary Examiner* — Henry Tsai
*Assistant Examiner* — Juanito Borromeo
(74) *Attorney, Agent, or Firm* — Christensen O'Connor Johnson Kindness PLLC

(57) ABSTRACT

Devices, systems, and methods for selectively pairing an upstream facing USB port device (UFP device) and a downstream facing USB port device (DFP device) over a network are disclosed. A controller device sends pairing commands to a selected UFP device and a selected DFP device, which then establish a connection with each other over a network. The controller device may subsequently cause the UFP device and/or the DFP device to remove the existing pairing and to instead pair with a different UFP device or DFP device. A pairing between a UFP device and a DFP device allows a host device coupled to the UFP device and a USB device coupled to the DFP device to communicate via a USB-compatible protocol.

20 Claims, 6 Drawing Sheets

(56) References Cited

U.S. PATENT DOCUMENTS

| | | |
|---|---|---|
| 7,647,446 B2 | 1/2010 | Okuma |
| 7,761,627 B2 | 7/2010 | Christison et al. |
| 2005/0120157 A1 | 6/2005 | Chen et al. |
| 2005/0278472 A1 | 12/2005 | Gierke |
| 2008/0028120 A1 | 1/2008 | McLeod |
| 2008/0071962 A1* | 3/2008 | Yang .................... G06F 9/4411 710/313 |
| 2010/0042767 A1 | 2/2010 | McLeod |
| 2011/0243035 A1 | 10/2011 | Hall et al. |

OTHER PUBLICATIONS

"Universal Serial Bus 3.0 Specification (Including Errata and ECNs Through May 1, 2011)," Revision 1.0, Jun. 6, 2011, 531 pages.
International Search Report and Written Opinion dated Mar. 26, 2014, issued in corresponding International Application No. PCT/CA2013/001060, filed Dec. 19, 2013, 8 pages.
Supplementary European Search Report dated Jun. 17, 2016, issued in corresponding European Application No. 13865640.0, filed Dec. 19, 2013, 6 pages.
Office Action dated Dec. 3, 2018, issued in corresponding Canadian Application No. 2,894,5670, filed Dec. 19, 2013, 4 pages.
Office Action dated Dec. 9, 2019, issued in corresponding Canadian Application No. 2,894,567, filed Dec. 19, 2013, 4 pages.

\* cited by examiner

SYSTEMS AND METHODS FOR EXCHANGING USB INFORMATION WITH SELECTED REMOTE DEVICES

CROSS-REFERENCES TO RELATED APPLICATIONS

This application is a continuation of U.S. application Ser. No. 13/791,579, filed Mar. 8, 2013, which claims the benefit of U.S. Provisional Application No. 61/740,378, filed Dec. 20, 2012, each expressly incorporated herein by reference in its entirety.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards, and are incorporated herein in their entireties for all purposes. One of ordinary skill in the art will recognize many terms herein from the USB Specifications. Those terms are used herein in a similar manner to their use in the USB Specifications, unless otherwise stated.

Traditionally, USB communication has been enabled between a host device and a USB device via a direct cable connection between the devices. What is needed are devices and techniques that enable a host device to be selectively paired with at least one of a plurality of USB devices on a network without changing the physical connections between the devices, and means for controlling such pairings.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computing device configured to control pairings between one or more upstream facing port devices (UFP devices) and one or more downstream facing port devices (DFP devices) on a network is provided. The computing device is configured to control such pairings by transmitting, via the network; a pairing command to a UFP device instructing the UFP device to pair with a DFP device; and transmitting, via the network, a pairing command to the DFP device instructing the DFP device to pair with the UFP device. If a USB host is coupled to the UFP device and a USB device is coupled to the DFP device, pairing between the UFP device and the DFP device allows the USB host to exchange USB information with the USB device.

In some embodiments, a USB extension device communicatively coupled to a network is provided. The USB extension device is configured to receive a command to pair via the network with a second USB extension device, the command including a unique identifier of the second USB extension device; and to pair with the second USB extension device by storing the unique identifier of the second USB extension device for use in linking the USB extension device with the second USB extension device via the network for the exchange of USB information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
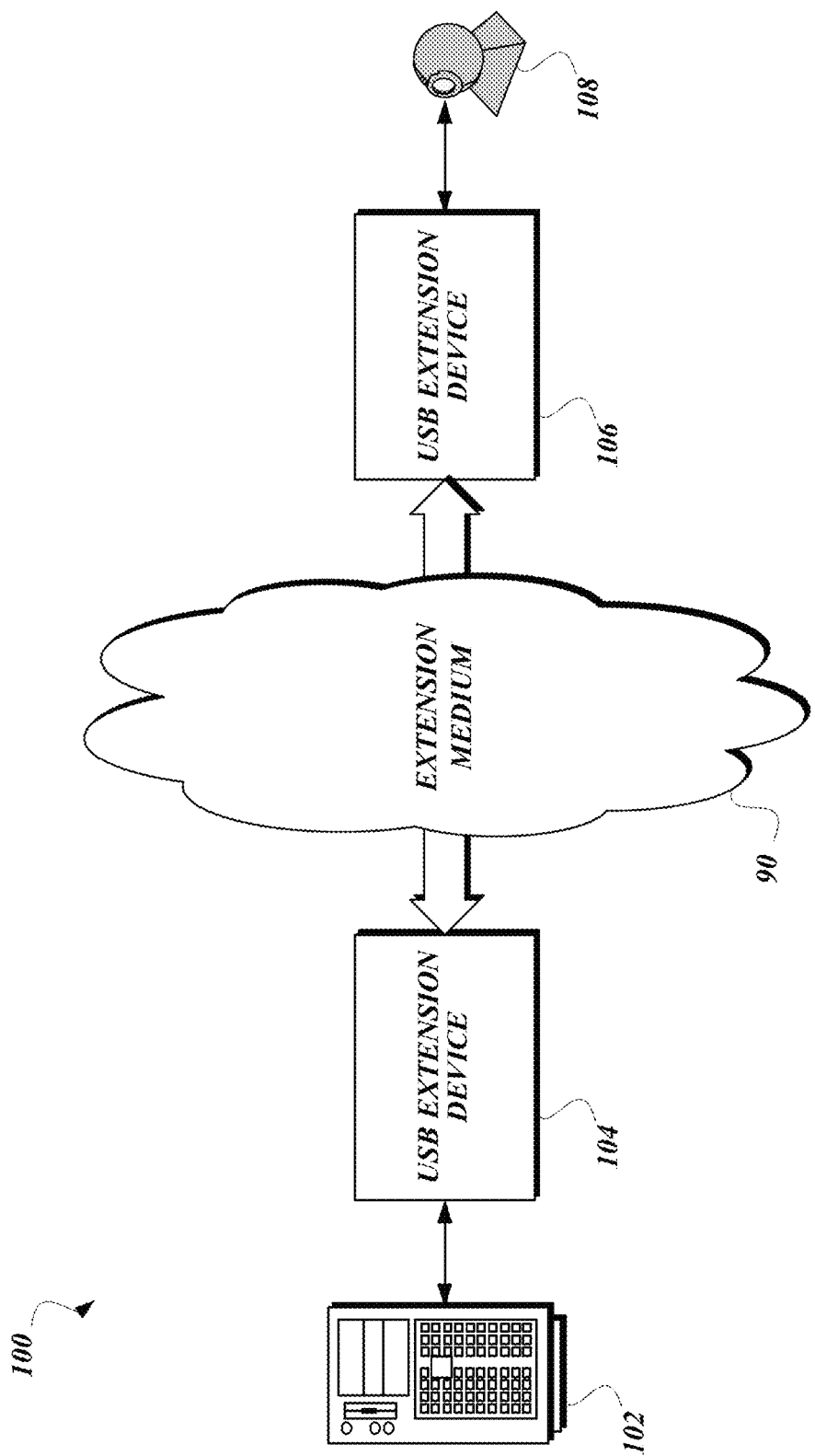
FIG. 1 is a block diagram that illustrates an exemplary embodiment of a system for extending USB communication according to various aspects of the present disclosure.

FIG. 1 is a block diagram that illustrates an exemplary embodiment of a system 100 for extending USB communication according to various aspects of the present disclosure. The system 100 includes a host device 102 and a USB device 108. Traditionally, the host device 102 and the USB device 108 would be directly connected via a USB cable, and would communicate directly with one another via a protocol that conforms to a USB specification, such as USB 1.0, USB 1.1, USB 2.0, or USB 3.0. As discussed above, such a connection would be limited to communication between the physically connected host device 102 and the USB device 108, unless the physical connections were altered.

The host device 102 may be any type of computing device containing a USB host controller. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host device 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via an extension medium 90. The extension medium 90 may increase the distance between the host device 102 and the USB device 108 beyond that supported by the USB specification and may provide routes for configurable connections between a plurality of upstream USB extension devices 104 and a plurality of downstream USB extension devices 106. The extension medium 90 and communication thereon may include any suitable networking technology, such as Ethernet, Bluetooth, WiFi, WiMax, the Internet, and/or the like, and any suitable communication medium, such as via physical cables, via wireless spectrum, and/or the like.

In some embodiments, the upstream USB extension device 104 and the downstream USB extension device 106 may happen to be closer to each other than the short USB requirement distance, and/or may be included in a single device instead of separated by the extension medium 90, but retain the capability of overcoming increased latency between the host device 102 and the USB device 108, as well as the configurability of connections between the upstream USB extension device 104 and the downstream USB extension device 106, as described further below.

Figure 2:
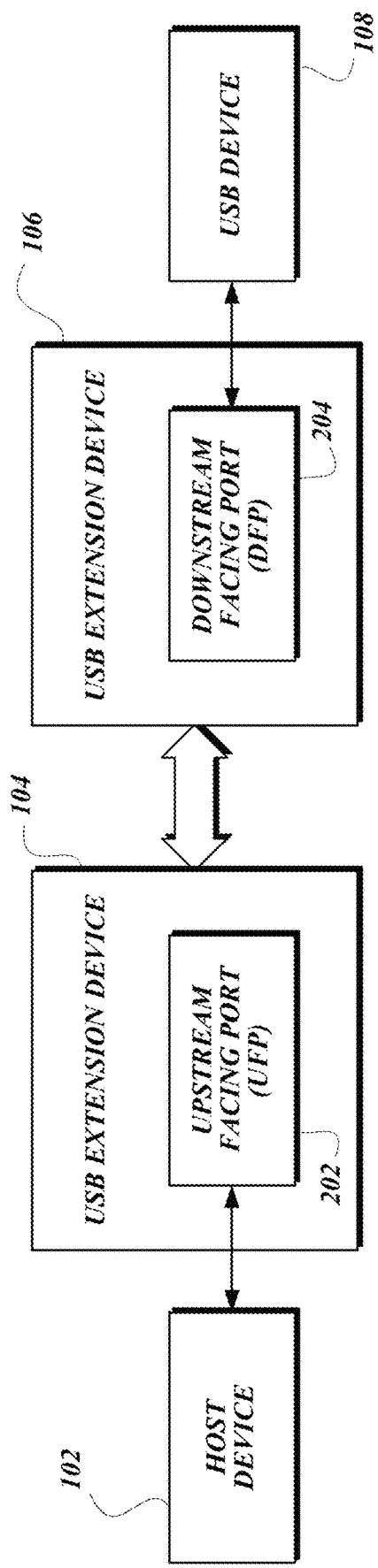
FIG. 2 is a block diagram that illustrates further details of the upstream USB extension device and downstream USB extension device illustrated in FIG. 1.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." Also, because the upstream USB extension device 104 has been configured to provide an upstream facing port 202, the upstream USB extension device 104 may also be described herein as an upstream facing port device, or UFP device. Likewise, because the downstream USB extension device 106 has been configured to provide a downstream facing port 204, the downstream USB extension device 106 may also be described herein as a downstream facing port device, or DFP device.

The UFP 202 is configured at least to communicate with the host device 102 via a USB-standard-compliant protocol, and to exchange messages and USB bus traffic with the DFP 204. The DFP 204 is configured at least to communicate with the device 108 via a USB-standard-compliant protocol, and to exchange messages and USB bus traffic with the UFP 202. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of a host device 102, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host device 102, such as a downstream facing port of a hub and/or the like. Likewise, in other embodiments, the downstream facing port 204 of the downstream USB extension device 106 may be connected to an upstream facing port other than one provided by a USB device 108, such as an upstream facing port of a hub and/or the like. The discussion below is primarily in terms of connections of a host device 102 to a UFP device 104, and of USB devices 108 to DFP devices 106, but one of ordinary skill in the art will recognize that in some embodiments similar techniques may be used in other topologies without departing from the scope of the present disclosure.

Figure 3:
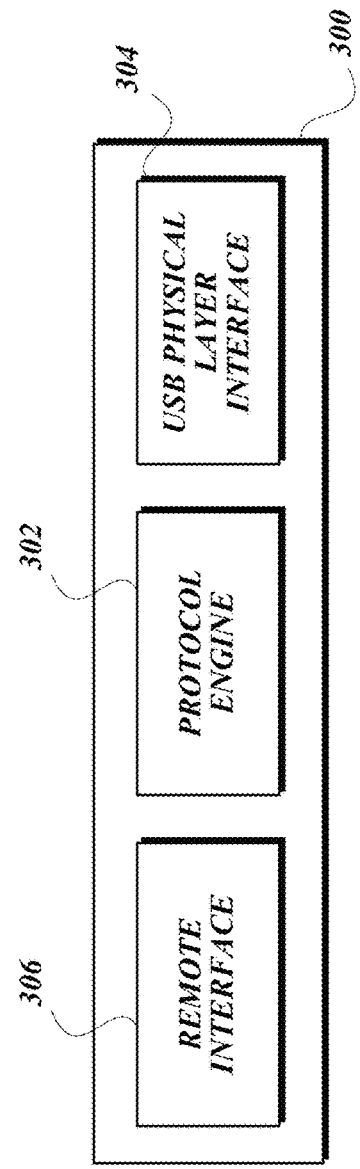
FIG. 3 is a block diagram that illustrates an exemplary embodiment of a port device according to various aspects of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 302, a USB physical layer interface 304, and a remote interface 306. In some embodiments, the protocol engine 302 may be configured to instruct the USB physical layer interface 304 to apply the appropriate electrical signals to the USB physical layer in order to communicate with the USB device 108 or the host device 102. Likewise, the protocol engine 302 may instruct the remote interface 306 to exchange information with the remote USB extension device. In some embodiments, the remote interface 306 may be configurable as described below to pair with a specified remote USB extension device, and/or to change its pairing to a new remote USB extension device upon receiving instructions to do so.

In some embodiments, the port device 300 may include more than one USB physical layer interface 304, which are configured to share a single remote interface 306 and/or a single protocol engine 302. In this way, the port device 300 may appear to the host device 102 or USB device 108 to consolidate multiple upstream facing ports 202 or downstream facing ports 204 into a single port device 300. In embodiments wherein port devices 300 are configurable to pair to a specified remote USB extension device as described below, the configuration may include an indication of which USB physical layer interface 304 is to be paired.

In some embodiments, the protocol engine 302 and/or the remote interface 306 may be implemented within a logic device such as a PLD, an ASIC, a FPGA, and/or the like. In other embodiments, the protocol engine 302 and/or the remote interface 306 may be implemented within a computing device having at least one processor and a memory containing computer-executable instructions that, if executed by the at least one processor, cause the protocol engine 302 and/or the remote interface 306 to perform actions as described below; a dedicated digital hardware device implemented, for example, as a state machine configured to perform the actions described below; within an application specific processor; and/or within any other suitable computing device.

In some embodiments, logic of actions attributed to a USB extension device may be executed by a protocol engine 302, which then instructs a USB physical layer interface 304 and/or a remote interface 306 to perform the appropriate communication steps associated with the logic. Throughout the discussion below, such actions may simply be described as being performed by the UFP 202 or the DFP 204 as if it was a single device for ease of discussion. One of ordinary skill in the art will recognize that actions attributed directly to the UFP 202 or the DFP 204 may actually be performed by a protocol engine 302, a USB physical layer interface 304, a remote interface 306, and/or some other component of the USB extension device.

Figure 4:
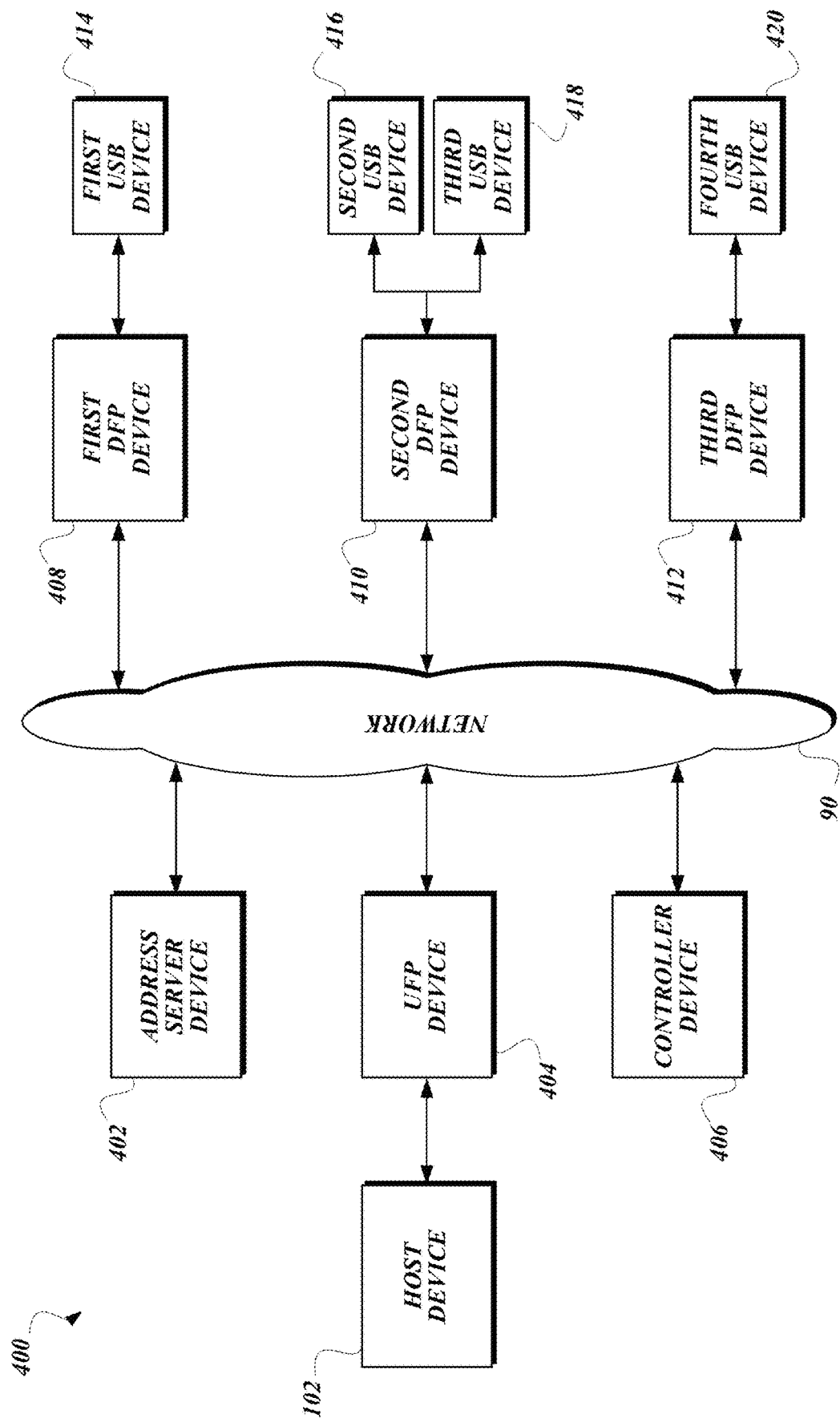
FIG. 4 is a schematic diagram that illustrates an exemplary embodiment of a communication topology enabled by various aspects of the present disclosure.

FIG. 4 is a schematic diagram that illustrates an exemplary embodiment of a communication topology 400 enabled by various aspects of the present disclosure. As described above, a host device 102 and a USB device 108 may communicate via a UFP device 104 and a DFP device 106. In embodiments of the present disclosure, the UFP device 404 may be selectively paired to one or more DFP devices, in order to change the USB devices with which the host device 102 can communicate. As illustrated, if the UFP device 404 is paired to the first DFP device 408, the host device 102 may communicate with the first USB device 414 coupled to the first DFP device 408. If the pairing of the UFP device 404 is changed such that the UFP device 404 is now paired with the second DFP device 410, the host device 102 can no longer communicate with the first USB device 414, but can instead communicate with the second USB device 416 and the third USB device 418. Likewise, if the pairing of the UFP device 404 is again changed such that the UFP device 404 is now paired with the third DFP device 412, the host device 102 can now communicate with the fourth USB device 420 and not the second USB device 416 or the third USB device 418. As discussed above, in some embodiments, each UFP device or DFP device may bundle multiple upstream facing ports or downstream facing ports together in a single device. In such embodiments, the pairing may include an indication of, for example, which downstream facing port of a DFP device should be paired to a given UFP device.

Though the UFP device 404 is described above as being paired to only one DFP device, in some embodiments, the UFP device 404 may be paired with more than one DFP device at once. This topology is analogous to having a hub that has a single upstream facing port, but supports multiple downstream facing ports. That is, the UFP device 404 may pair to as many DFP devices as would be supported if the UFP device 404 were a USB hub connected directly to the USB devices coupled to the DFP devices.

In some embodiments, a controller device 406 may be used to receive configuration information from, and send configuration commands to, the UFP device 404 and the DPF devices 408, 410, 412 via the network 90. In some embodiments, the controller device 406 may broadcast requests for configuration information to the network 90, using a technique such as IP broadcast, IP multicast, and/or any other suitable technique. The USB extension devices connected to the network 90 may then transmit responses to the controller device 406, which receives and compiles the responses to form a representation of the communication topology 400. The responses transmitted to the controller device 406 by a USB extension device may include information such as, but not limited to, a unique hardware identifier (such as a MAC address or the like), a network address (such as an IP address or the like), a supported protocol version, a vendor name, a product name, a revision, and/or identifiers of one or more other USB extension devices with which the USB extension device is paired. The controller device 406 may use the configuration information to generate a graphical representation of the communication topology 400, and may subsequently present the graphical representation of the communication topology 400 to a user. The controller device 406 may also accept commands from a user with respect to the presented communication topology 400 in order to reconfigure the communication topology 400, as discussed below.

The controller device 406 may be any computing device suitable for providing commands to the UFP device 404 and the DFP devices 408, 410, 412. For example, the controller device 406 may be a laptop computer, desktop computer, tablet computer, smartphone, or other computing device connected to the network 90, and may request information from and send commands to the UFP device 404 and DFP devices 408, 410, 412 via the network 90. As another example, the controller device 406 may be integrated partially or fully within the host device 102, the UFP device 404, one of the DFP devices 408, 410, 412, or one of the USB devices 414, 416, 418, 420, and may accept configuration commands from the user via a user interface device including, but not limited to, a mechanical button or switch, a jumper setting, a dip switch, and a device configured to present a graphical user interface. Though a single controller device 406 is illustrated in FIG. 4, in some embodiments, more than one controller device 406 may be used.

In some embodiments, the controller device 406 is configured to send configuration commands to the UFP device 404 and the DFP devices 408, 410, 412 that include instructions regarding how the UFP device 404 and the DFP devices 408, 410, 412 should be configured to communicate on the network. For example, in some embodiments, the controller device 406 may send a command to a UFP device 404 instructing the UFP device 404 to automatically obtain an IPv4 address from an address server device 402 (such as a DHCP server and/or the like) on the network 90. As another example, in some embodiments, the controller device 406 may send a command to a UFP device 404 instructing the UFP device 404 to use a static IPv4 address supplied in the command. As yet another example, in some embodiments, the controller device 406 may send a command to a UFP device 404 instructing the UFP device 404 to obtain an IPv6 address using stateless address autoconfiguration (SLAAC), or using any other suitable technique. One of ordinary skill in the art will understand that such commands could also be sent to any of the DFP devices 408, 410, 412, and that any other suitable technique for obtaining an address on any type of network may also be used.

FIG. 4 illustrates a generic communication topology 400, but one of ordinary skill in the art will recognize that the communication topology 400 has many useful applications. In one exemplary embodiment, the communication topology 400 may be used to provide a surveillance system. Each of the USB devices 414, 416, 418, 420 may be a different USB-capable camera distributed through a building. Due to the distance limitations imposed by the USB Specifications, USB extension devices are used to bridge the distance between the host device 102 and the cameras. So that the host device 102 may monitor each of the cameras in turn, the UFP device 404 may first pair with the first DFP device 408 to connect the camera represented by the first USB device 414 to the host device 102. The UFP device 404 may then pair with the second DFP device 410 so that the host device 102 can monitor the cameras represented by the second USB device 416 and third USB device 418, and so on. In another exemplary embodiment, the communication topology 400 may be used to provide access to a variety of USB-capable storage devices, sensors, or any other type of device that may be distributed over an area impractical or impossible to connect via standard USB connections.

In yet another exemplary embodiment, similar techniques may be used to allow a DFP device 408, 410, 412 to pair with a variety of UFP devices 404. Though only a single UFP device 404 and a single host device 102 are illustrated in FIG. 4, one of ordinary skill in the art will recognize that a DFP device 408, 410, 412 may be instructed to pair with different UFP devices connected to different host devices if more than one UFP device is available on the network 90. This may be useful in a case where a single set of USB-capable user input devices (such as a keyboard, a mouse, and/or the like) is coupled to a DFP device (such as DFP device 410), and changing the pairing between the second DFP device 410 and a given UFP device will change which host the user input devices are controlling.

Figure 5:
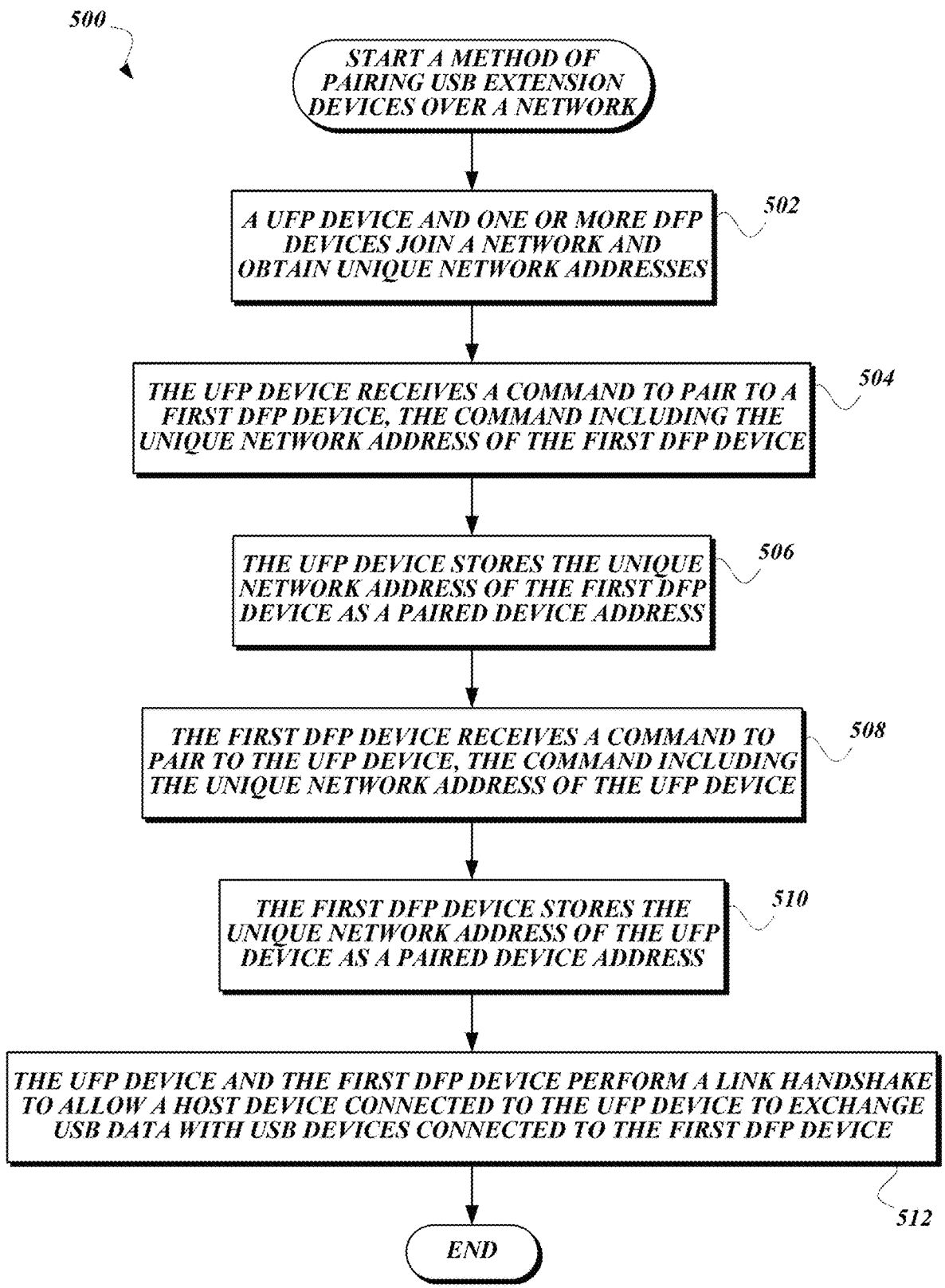
FIG. 5 is a flowchart that illustrates an exemplary embodiment of a method of pairing USB extension devices over a network, according to various aspects of the present disclosure.

FIG. 5 is a flowchart that illustrates an exemplary embodiment of a method of pairing USB extension devices over a network, according to various aspects of the present disclosure. From a start block, the method 500 proceeds to block 502, where a UFP device 404 and one or more DFP devices 408, 410, 412 join a network 90 and obtain unique network addresses. As discussed above, the unique network addresses may be IPv4 addresses obtained via an instruction to use a static IP address, IPv4 addresses obtained via DHCP, IPv6 addresses obtained via SLAAC, or any other suitable unique network addresses. In some embodiments, the unique network address may be associated with the respective remote interfaces 306 of the UFP device 404 and the DFP devices 408, 410, 412. In such embodiments, if the UFP device 404 is bundled with other UFP devices to share a single remote interface 306, or one of the DFP devices 408, 410, 412 is bundled with other DFP devices to share a single remote interface 306, a unique identifier may also be obtained for each of the bundled devices.

Next, at block 504, the UFP device 404 receives a command to pair to a first DFP device 408, the command including the unique network address of the first DFP device 408. In some embodiments, the command may be generated by a user interacting with a graphical representation of the communication topology 400 presented by a controller device 406. In other embodiments, the command may be generated in simpler ways. For example, in some embodiments, a button may be pressed on the first DFP device 408 to cause the first DFP device 408 to broadcast its unique network address, while a button is pressed on the UFP device 404 to cause the UFP device 404 to interpret the network address broadcast by the first DFP device 408 as a command to pair with the first DFP device 408. In some embodiments, a unique network address of the first DFP device 408 may be manually entered into the UFP device 404, using an interface integrated into the UFP device 404, a set of dip switches or jumpers integrated into the UFP device 404, or using any other suitable technique.

One of ordinary skill in the art will recognize that, although "unique network addresses" are used in the discussion herein for addressing messages to particular USB extension devices, other techniques could be used to uniquely identify each of the USB extension devices in the communication topology 400. For example, MAC addresses or other suitable unique hardware identifiers could be used to uniquely address the USB extension devices.

At block 506, the UFP device 404 stores the unique network address of the first DFP device 408 as a paired device address. The paired device address may be stored in a register, a dynamic random access memory (DRAM), a static random access memory (SRAM), an electrically programmable read-only memory (EEPROM), a non-volatile random access memory (NVRAM) such as a flash memory and/or the like, or any other suitable type of computer-readable medium. Upon storing the paired device address, the UFP device 404 and first DFP device 408 are not yet communicating, but storing the paired device address by the UFP device 404 does indicate that the UFP device 404 should attempt to link with the indicated device when appropriate.

The method 500 then proceeds to block 508, where the first DFP device 408 receives a command to pair to the UFP device 404, the command including the unique network address of the UFP device 404. In block 510, the first DFP device 408 stores the unique network address of the UFP device 404 as a paired device address. The receiving of the command to pair to the UFP device 404 and the storing of the unique network address of the UFP device 404 are performed similar to the way the similar actions were performed by the UFP device 404 as described above.

The method 500 then proceeds to block 512, where the UFP device 404 and the first DFP device 408 perform a link handshake to allow a host device 102 connected to the UFP device 404 to exchange USB data with USB devices connected to the first DFP device 408 (such as first USB device 414). One example of a link handshake that connects the UFP device 404 and the first DFP device 408 is described in co-pending, commonly owned U.S. patent application Ser. No. 13/229,583, the entire disclosure of which is hereby incorporated by reference for all purposes. However, in other embodiments, any other suitable link handshake between the UFP device 404 and the first DFP device 408 may be used. The host device 102 and first USB device 414 may continue to exchange USB information as the method 500 proceeds to an end block and terminates.

As illustrated and described, the method 500 assumes for the sake of discussion that neither the UFP device 404 nor the first DFP device 408 is currently paired either to each other or to other USB extension devices. In some embodiments, in a case where the UFP device 404 or the first DFP device 408 is previously paired to another USB extension device, the pairing command may be met with a negative acknowledgement, and the method 500 may terminate without the UFP device 404 and the first DFP device 408 becoming paired to each other. In other embodiments, in such a case the pairing command may be treated as a command to terminate a current pairing, and to then pair to the newly specified USB extension device.

Figure 6A:
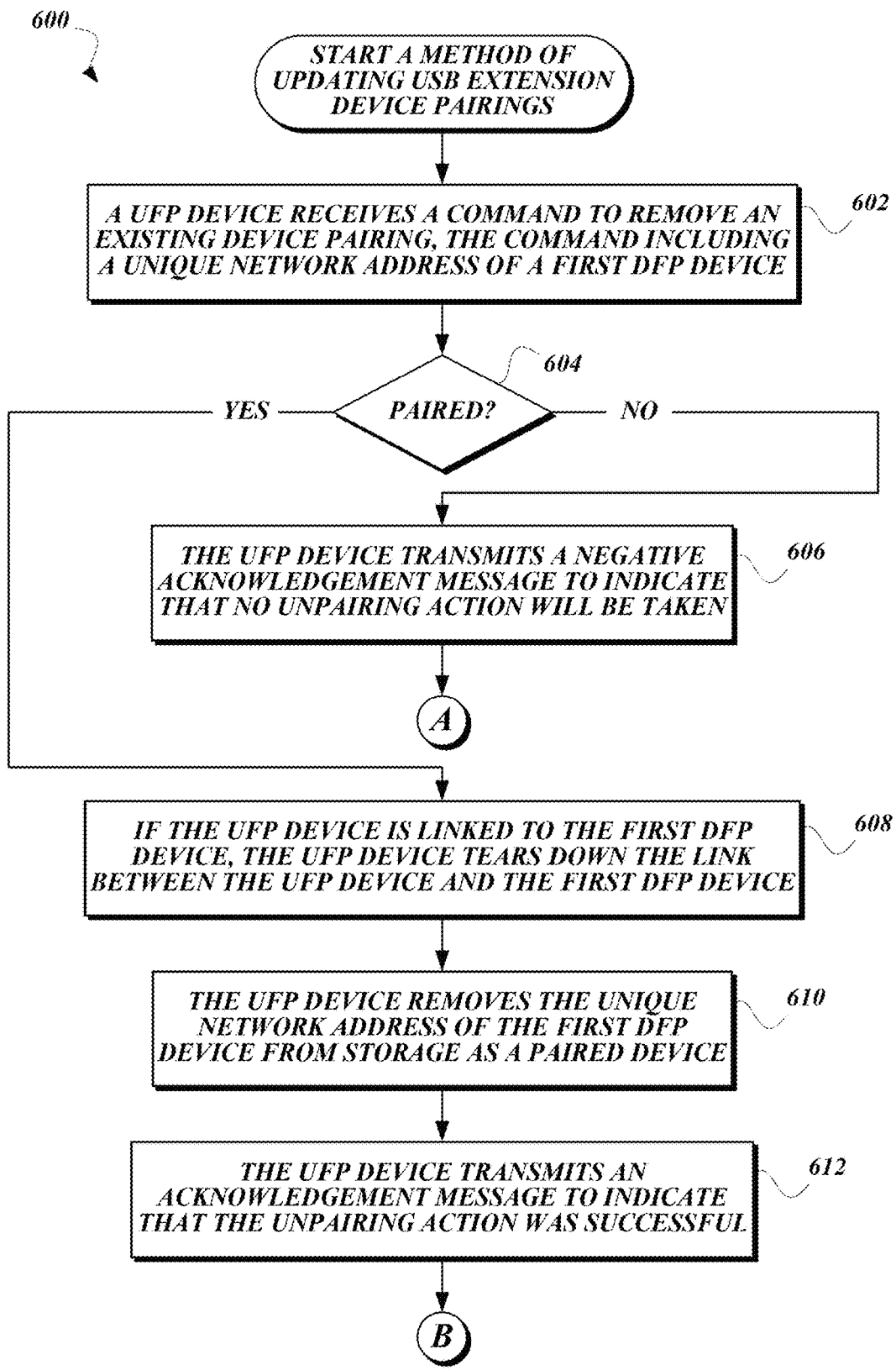
FIGS. 6A-6B are a flowchart that illustrates an exemplary embodiment of a method of updating USB extension device pairings according to various aspects of the present disclosure.
Figure 6B:
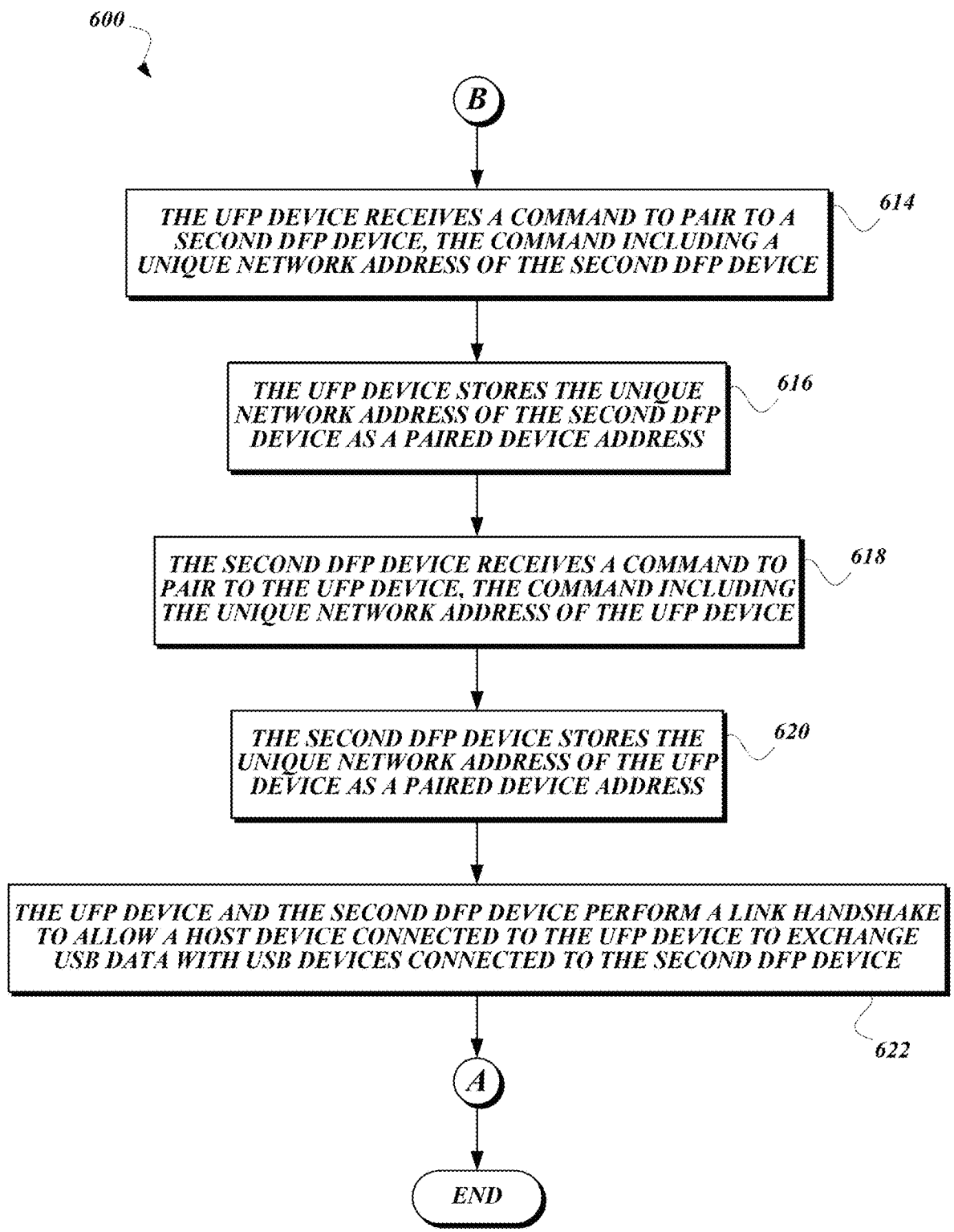

Once USB extension devices are paired to each other, those pairings may be updated upon the receipt of further commands from the controller device 406. As discussed above, this may be useful in cases where a single set of USB devices may be selectively coupled to one of a group of available hosts, and/or in cases where a single host may be coupled to selected USB devices. FIGS. 6A and 6B are a flowchart that illustrates an exemplary embodiment of a method of updating USB extension device pairings according to various aspects of the present disclosure. From a start block, the method 600 proceeds to block 602, where a UFP device 404 receives a command to remove an existing device pairing, the command including a unique network address of a first DFP device 408. The method 600 then proceeds to a decision block 604, where a test is performed to determine whether the UFP device 404 is paired to the first DFP device 408 indicated in the command. If the UFP device 404 is paired to the first DFP device 408, the result of the test at decision block 604 is YES, and the method 600 proceeds to block 608. At block 608, if the UFP device 404 is linked to the first DFP device 408 (that is, there is currently an active connection between the devices, and they do not simply indicate that they are paired with each other without a link being active), the UFP device 404 tears down the link between the UFP device 404 and the first DFP device 408. Tearing down the link may include placing the associated USB connections in a suspend, reset, or off state, switching off receiver termination at the USB extension devices, terminating VBUS power, and/or any other suitable actions for ending the USB connection between the host 102 and the first USB device 414. Next, at block 610, the UFP device 404 removes the unique network address of the first DFP device 408 from storage as a paired device. The method 600 then proceeds to block 612, where the UFP device 404 transmits an acknowledgement message to indicate that the unpairing action was successful. In some embodiments, the acknowledgement message is addressed to and received by the controller device 406 that sent the unpairing command. The acknowledgement message may then be used by the controller device 406 to update its internal representation of the communication topology 400. In some embodiments, the first DFP device 408 may receive a similar unpairing command and transmit a similar acknowledgement message, though in other embodiments, the first DFP device 408 may not receive further notice that the UFP device 404 is no longer paired with it. The method 600 then proceeds to a continuation terminal ("terminal B").

From terminal B (FIG. 6B), the method 600 proceeds to block 614, where the UFP device 404 receives a command to pair to a second DFP device 410, the command including a unique network address of the second DFP device 410. As above, the method 600 as illustrated and described assumes that the second DFP device 410 is not currently paired to any USB extension device. In some embodiments, an unpairing command similar to those described above may be transmitted to and processed by the second DFP device 410 if it is determined that the second DFP device 410 is previously paired to another USB extension device.

From here, the method 600 proceeds similarly to the method 500 discussed above with respect to the initial pairing. At block 616, the UFP device 404 stores the unique network address of the second DFP device 410 as a paired device address. At block 618, the second DFP device 410 receives a command to pair to the UFP device 404, the command including the unique network address of the UFP device 404. Next, at block 620, the second DFP device 410 stores the unique network address of the UFP device as a paired device address, and at block 622, the UFP device 404 and the second DFP device 410 perform a link handshake to allow a host device 102 connected to the UFP device 404 to exchange USB data with USB devices connected to the second DFP device 410 (such as the second USB device 416 and third USB device 418). The method 600 then proceeds to continuation terminal ("terminal A"), and then to an end block, where the method 600 terminates.

Back at decision block 604 (FIG. 6A), if the UFP device 404 is not paired to the first DFP device 408, the result of the test at decision block 604 is NO, and the method 600 proceeds to block 606, where the UFP device 404 transmits a negative acknowledgement message to indicate that no unpairing action will be taken, and then to a continuation terminal ("terminal A") which leads to the end of the method 400. In some embodiments, the controller device 406 receives the negative acknowledgement message and gathers information to determine the present state of the communication topology 400. Once a correct pairing relationship is determined for the UFP device 404, the controller device 406 may cause the method 600 to be restarted.

The UFP device 404 may not be paired to the first DFP device 408 because it is paired to a different USB extension device, or because it is not paired to any USB extension device. In some embodiments, if the UFP device 404 is unpaired, the result of the test in decision block 604 is YES instead of NO, because the UFP device 404 is free to be paired to another USB extension device. In such an embodiment, the method 600 may skip blocks 608, 610, and 612 and proceed directly to terminal B.

Likewise, a test similar to that described in block 604 may be performed upon sending an unpairing command to the first DFP device 408 (the previously paired USB extension device), and again upon sending an unpairing command to the second DFP device 410 (the new USB extension device to pair with the UFP device 404). The controller device 406 may wait until acknowledgement messages are successfully received from all relevant USB extension devices before sending a pairing command to any of the USB extension devices, and may cause the method 600 to terminate if any negative acknowledgement messages are received.

In the embodiments illustrated and described above, explicit unpairing comments are sent by the controller device 406 to the USB extension devices to remove previous pairing relationships. In other embodiments, receipt of a pairing command may implicitly command the receiving USB extension device to discard its old pairing relationship before setting up the new pairing relationship.

While illustrative embodiments have been illustrated and described, it will be appreciated that various changes can be made therein without departing from the spirit and scope of the claimed subject matter. Although the method and various embodiments thereof have been described as performing sequential steps, the claimed subject matter is not intended to be so limited. As nonlimiting examples, the described steps need not be sequential and/or not all steps are required to perform the method. As such, one of ordinary skill will appreciate that such examples are within the scope of the claimed embodiments.

The invention claimed is:

1. A computing device configured to control pairings between one or more upstream facing port devices (UFP devices) and one or more downstream facing port devices (DFP devices) on a network by:
   transmitting, via the network, a first pairing command, wherein the first pairing command causes a first UFP device to pair with a first DFP device of a plurality of DFP devices on the network; and
   transmitting, via the network, a second pairing command, wherein the second pairing command causes the first UFP device to pair with a second DFP device of the plurality of DFP devices instead of the first DFP device;
   wherein a USB host is coupled to the first UFP device, a first USB device is coupled to the first DFP device, and a second USB device is coupled to the second DFP device;
   wherein the USB host can exchange USB information with the first USB device but not the second USB device while the first UFP device is paired with the first DFP device instead of the second DFP device;
   wherein the USB host can exchange USB information with the second USB device but not the first USB device while the first UFP device is paired with the second DFP device instead of the first DFP device; and wherein the computing device is separate from the first UFP device, the first DFP device, and the second DFP device.

2. The computing device of claim 1, wherein the first pairing command includes a unique identifier of the first DFP device, and wherein the second pairing command includes a unique identifier of the second DFP device.

3. The computing device of claim 2, wherein the unique identifiers are link layer addresses.

4. The computing device of claim 3, wherein the link layer addresses are media access control (MAC) addresses.

5. The computing device of claim 2, wherein transmitting the pairing commands via the network includes a broadcast transmission, a multicast transmission, or a unicast transmission.

6. The computing device of claim 2, wherein the unique identifiers are IP addresses.

7. The computing device of claim 1, further configured to control pairings of a paired UFP device paired to a paired DFP device by:
transmitting, via the network, a remove pairing command to the paired UFP device or the paired DFP device.

8. The computing device of claim 1, further configured to obtain information from devices on the network by:
transmitting, via the network, a device information request command; and
receiving, via the network, a device information response from each device connected to the network, each device information response including:
a unique identifier of an associated device; and
a unique identifier of a paired device if the associated device is paired with another device.

9. The computing device of claim 8, wherein transmitting the device information request command includes transmitting a broadcast UDP packet that represents the device information request command.

10. The computing device of claim 1, further configured to obtain topology information from a UFP device or a DFP device by:
transmitting, via the network, a device topology request to the UFP device or the DFP device; and
receiving, via the network, a device topology response from the UFP device or the DFP device, the device topology response comprising USB addressing information for each USB device connected to the UFP device or the DFP device.

11. The computing device of claim 1, wherein the first UFP device is bundled with one or more additional UFP devices to share a single remote interface identified by a unique identifier.

12. The computing device of claim 1, wherein the first DFP device is bundled with one or more additional DFP devices to share a single remote interface identified by a unique identifier, and wherein the first pairing command includes the unique identifier of the single remote interface and an identifier of the first DFP device.

13. A computer-implemented method of controlling pairings between one or more upstream facing port devices (UFP devices) and one or more downstream facing port devices (DFP devices) on a network, the method comprising:

transmitting, by a controller device via the network, a first pairing command, wherein the first pairing command causes a first UFP device to pair with a first DFP device of a plurality of DFP devices on the network; and
transmitting, by the controller device via the network, a second pairing command, wherein the second pairing command causes the first UFP device to pair with a second DFP device of the plurality of DFP devices instead of the first DFP device;
wherein a USB host is coupled to the first UFP device, a first USB device is coupled to the first DFP device, and a second USB device is coupled to the second DFP device;
wherein the USB host can exchange USB information with the first USB device but not the second USB device while the first UFP device is paired with the first DFP device instead of the second DFP device; and
wherein the USB host can exchange USB information with the second USB device but not the first USB device while the first UFP device is paired with the second DFP device instead of the first DFP device.

14. The method of claim 13, wherein the first pairing command includes a unique identifier of the first DFP device, and wherein the second pairing command includes a unique identifier of the second DFP device.

15. The method of claim 14, wherein the unique identifiers are link layer addresses.

16. The method of claim 14, wherein transmitting the pairing commands via the network includes a broadcast transmission, a multicast transmission, or a unicast transmission.

17. The method of claim 14, wherein the unique identifiers are IP addresses.

18. The method of claim 13, further comprising controlling pairings of a paired UFP device paired to a paired DFP device by:
transmitting, by the controller device via the network, a remove pairing command to the paired UFP device or the paired DFP device.

19. The method of claim 13, further comprising obtaining information from devices on the network by:
transmitting, by the controller device via the network, a device information request command; and
receiving, by the controller device via the network, a device information response from each device connected to the network, each device information response including:
a unique identifier of an associated device; and
a unique identifier of a paired device if the associated device is paired with another device.

20. The method of claim 13, further comprising obtaining topology information from a UFP device or a DFP device by:
transmitting, by the controller device via the network, a device topology request to the UFP device or the DFP device; and
receiving, by the controller device via the network, a device topology response from the UFP device or the DFP device, the device topology response comprising USB addressing information for each USB device connected to the UFP device or the DFP device.

* * * * *